Patented Aug. 25, 1953

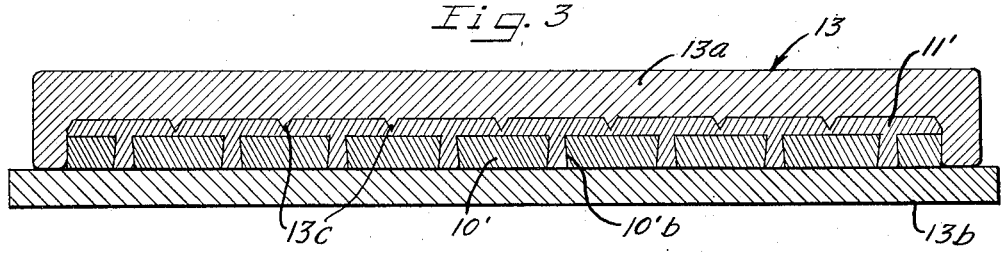
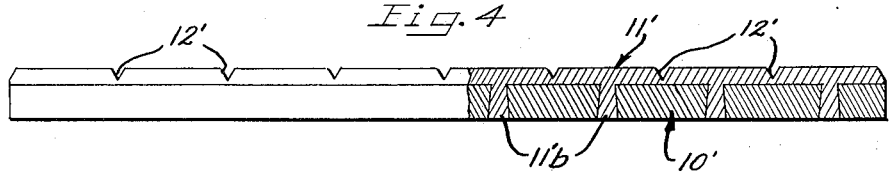
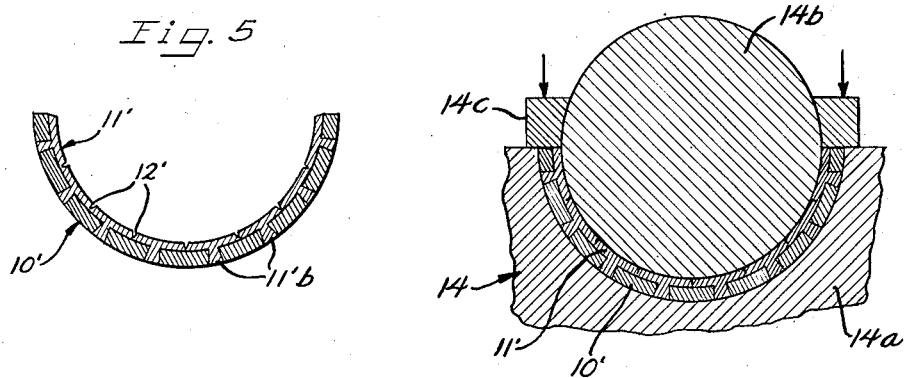
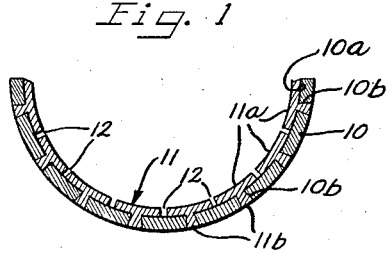
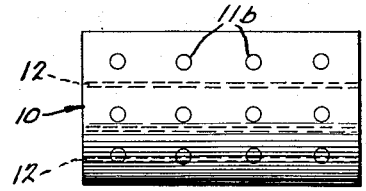
Inventor
Arthur Townhill

2,649,651

UNITED STATES PATENT OFFICE 2,649,651

METHOD OF FORMING A COMPOSITE BEARING

Arthur Townhill, Cleveland, Ohio, assignor to Thompson Products Inc., Cleveland, Ohio, a corporation of Ohio Application December 22, 1947, Serial No. 793,096

4 Claims. (Cl. 29—149.5)

This invention relates to an improved bearing of the type wherein a material having good bearing properties but a high thermal coefficient of expansion is supported by a rigid element having a lower thermal coefficient of expansion, and, in addition, to a method of manufacturing such bearing.

It has long been recognized that various materials, and particularly metals, having excellent anti-friction properties that make such materials desirable as bearing surfaces are also characterized by relatively low physical strength characteristics and a high thermal coefficient of expansion. Therefore, to take advantage of the excellent bearing properties of such materials, it has been common heretofore to provide a composite bearing structure wherein a relatively riged supporting or backing element was formed of steel, or similar material of high structural strength, and the bearing surface was defined by a layer of the material having good bearing properties but characterized by low physical strength characteristics and high thermal coefficient. However, in any application where such composite bearing was subjected to a substantial range of temperatures between ambient or starting and operating conditions, great difficulty has been experienced due to the large difference in thermal expansion of the two materials making up the composite bearing. The bearing material tended to expand more rapidly than the supporting element and, as a result, it very often happened that the bond between the two materials was destroyed, or the bearing material was deformed at the operating temperature of the bearing to such an extent as to produce an undesirably large clearance under ambient or starting temperature conditions.

A feature of this invention is the provision of a composite bearing structure characterized by the formation of a bearing surface by a plurality of circumferentially spaced layer sections of material of good bearing properties, supported upon a backing element providing the requisite physical strength but having a lower thermal expansion coefficient than that of the bearing material. The various layer sections of bearing material are secured to the backing element only at isolated regions so that the major portion of each layer section is free to expand relative to the backing element and such expansion is absorbed in the circumferential direction by the spaces provided between the adjacent layer sections. The width of such spaces is carefully proportioned so that a complete filling of the space by the expanding bearing material will not occur until a temperature substantially above the expected operating temperature of the bearing is reached. Hence, under all normal conditions of operation and starting, a space is provided between each of the adjacent bearing layer sections which serves as an oil groove or trap to retain lubrication within the bearing at all times and thus insures proper lubrication of the bearing under starting conditions.

It will be recognized by those skilled in the art that the aforedescribed bearing construction would involve many difficulties if fabricated according to conventional methods, and, in fact, would involve such a large manufacturing cost as would make it impractical for such bearing construction to compete with more conventional constructions, even though the conventional constructions are less desirable in performance. Accordingly, this invention provides a unique and economical method of fabricating a composite bearing which is particularly adaptable to low cost, high quantity production methods and, in fact, permits such composite bearing structure to be manufactured in its entirety without resorting to expensive and time consuming milling operations.

Accordingly, it is an object of this invention to provide an improved bearing construction, and particularly a composite bearing formed of two materials having substantially different thermal expansion coefficients, which will nevertheless permit the successful operation of such bearing over a wide range of temperatures.

Another object of this invention is a provision of an economical method for fabricating a composite bearing and particularly, a composite bearing formed by two materials having substantially different coefficients of thermal expansion.

A particular object of this invention is to provide a composite bearing fabrication method wherein the bearing may be completely formed by low cost, high quantity production methods and particularly, wherein no milling operations are required, even though the finished bearing is provided with a plurality of oil retaining grooves in its bearing surface.

The specific nature of this invention as well as other objects and advantages thereof will become apparent to those skilled in the art from the following detailed description of the annexed sheet of drawings which, by way of preferred example only, illustrate one specific embodiment of the invention.

On the drawings:

Figure 1 is a sectional view, taken upon a radial plane, of a finished composite bearing element embodying this invention;

Figure 2 is a side elevational view of the bearing of Figure 1;

Figure 3 is a schematic sectional view illustrating the manner of casting a layer of bearing material upon a sheet of backing material which constitutes the first step of the process embodying this invention;

Figure 4 is an elevational view, partly in section of a composite bearing element in the form in which it appears after the casting operation;

Figure 5 is a sectional view of a composite bearing element after the bending or rolling step of the process; and Figure 6 is a diagrammatic sectional view illustrating a further step in the process of producing a composite bearing wherein the bearing is subjected to a temperature above the expected operating temperature while confined in a die.

As shown on the drawings:

Referring particularly to Figures 1 and 2, it will be noted that a composite bearing embodying this invention comprises a backing element 10 which defines an interior, arcuate surface 10a. Backing element 10 is preferably formed of material such as iron or steel having the necessary structural strength characteristics for the particular application for which the bearing is designed. While not limited thereto, when the composite bearing is formed according to the process of this invention, the backing element 10 may be formed from sheet material which is then rolled into the semi-cylindrical configuration shown in Figures 1 and 2.

It should be distinctly understood that while the specific example of this invention represented in the drawings illustrates a bearing unit of semi-cylindrical configuration, the principles of this invention are obviously applicable to the production of a complete cylinder bearing or to any other desired configuration of bearing surface. Those skilled in the art will, of course, recognize that two of the semi-cylindrical units shown in the drawings may be assembled by well known means to form a full cylinder bearing.

On the inner arcuate surface 10a of the backing element 10 a layer 11 of bearing material is provided. In the finished form of the bearing, the layer 11 is not continuous but comprises a plurality of circumferentially spaced layer sections 11a, each of which is separated by a space 12. Each of the layer sections 11a is secured to the backing element 10 in any desired manner, such as by having integral, tapering projections 11b received in complementarily shaped holes 10b provided in the backing element. The important feature of any particular securement used is that it should not secure the entire surface area of the layer sections 11a rigidly to the backing element 10 but preferably, the securement should occur only at a plurality of spaced regions of each of the layer sections 11a. Hence, those portions of each layer section 11a remote from the secured regions represented by the projections 11b are free to expand in a circumferential direction with respect to the backing element 10.

With the bearing constructed as described, it will be apparent that under normal temperature conditions, particularly under starting temperature conditions, the spaces 12 will serve to trap a substantial amount of oil therebetween and provide adequate lubrication for the bearing during the starting period. As the temperature of the bearing increases under operating conditions, the bearing layer sections 11a are each free to expand relative to the backing element 10 which, of course, they do because of the substantial difference in temperature coefficients of expansion of the two materials. The expansion will take place freely into the spaces 12 until such a temperature is reached that the resulting expansion of the bearing layer sections 11a is sufficient to bring the adjacent sections into contacting relationship.

According to this invention, the width of the spaces 12 is carefully controlled so as to insure that the adjacent layer sections 11a will not expand sufficiently to contact each other until a temperature is reached which is substantially above the expected operating temperature of the bearing but yet is below the temperature at which the bearing material is readily deformable. In the particular example of the bearing layer sections 11a being formed of aluminum and supported upon a steel backing, the spaces 12 are proportioned so as to permit free expansion of the aluminum layer section until a temperature in the neighborhood of 400° F. is reached. This temperature, of course, is substantially in excess of the normal operating temperatures of aluminum bearing and hence, under normal operating conditions, it is assured that some width of the spaces 12 will be retained to function as oil grooves and, more important, that the aluminum bearing layer sections 11a will be free to expand relative to the backing element 10 and hence will not be deformed by the expansion resulting from the normal operating temperatures. At temperatures above 400° F., the aluminum becomes sufficiently plastic so that it would probably be deformed under the normal load to be carried by the bearing, and there is therefore no reason for providing for further expansion of the aluminum section layers above such temperature. Therefore, optimum bearing conditions are established, inasmuch as the maximum bearing surface area of the layer sections 11a will be provided at starting temperature conditions which, of course, is very desirable from the standpoint of maintaining the load per unit area of the active bearing surfaces as small as possible.

While the novel bearing construction heretofore described could conceivably be produced by conventional methods, involving milling operations to produce the spaces 12 between the bearing layer sections 11a, this invention also provides a unique process for fabricating such composite bearing which completely eliminates the need for milling or similar high cost, time consuming operations.

The first step of the process is illustrated in Figure 3 wherein there is diagrammatically shown a mold unit 13 comprising a generally cup-shaped mold base portion 13a and a cover plate 13b within which a layer 11' of aluminum or similar material having good bearing properties but a high thermal coefficient of expansion, may be integrally cast upon a supporting sheet 10', preferably formed of material such as iron or steel having high physical strength but a lower thermal coefficient of expansion, than the bearing material. The sheet 10' is provided with a plurality of spaced recesses 10'b which are of tapered configuration with the small end of the recess being disposed adjacent the surface of sheet 10' upon which the bearing material is to be cast. In addition, the mold base 13a is provided with a plurality of transversely spaced, elongated projections 13c which extend toward the opposite face of the backing plate 10', but do not contact such plate.

Therefore, when the backing plate 10' is positioned within the mold unit 13 and the spaces therebetween are filled with molten bearing material, a composite sheet will be formed, as shown in Figure 4, comprising the backing sheet 10' with a layer of bearing material 11' rigidly secured thereto at a plurality of spaced regions represented by the integral cast projections 11'b. Furthermore, the mold projections 13c will have produced a plurality of spaced, elongated grooves 12' in the exposed surface of the bearing material 11' and located intermediate the securing projection 11'c. Such grooves do not, however, extend entirely through the layer 11'.

In the next step of the process, the composite sheet is bent or rolled into either semi-cylindrical or full-cylindrical configuration. As shown in Figure 5, the effect of the rolling operation is to cause the bearing material 11' to flow into the grooves 12' and to partially fill such groove.

In the next step of the process as represented by Figure 6, the composite bearing unit is heated to a temperature substantially above the expected operating temperature of the bearing. In the case of an aluminum faced bearing, a temperature in the range of 400° F. is employed. During such heating operation, the bearing material layer 11' is confined against relative expansion movement with respect to the backing element 10'. Such restraint or confinement might be conveniently accomplished by inserting the composite bearing in a mold unit 14, such mold unit comprising a base portion 14a recessed to receive the arcuate exterior of the backing sheet 10, a mandrel portion 14b contoured to snugly fit against the cylindrical interior surface of the bearing layer 11' and a clamping or restraining collar 14c which is secured in any conventional manner to the base unit 14a and retains the mandrel unit 14b in rigid relationship with respect to the base unit 14a. Under these conditions, the effect of heating the bearing unit to such an elevated temperature, while restraining the bearing layer 11' against displacement relative to the backing sheet 10', is to produce a flow of the material of the bearing layer 11' to completely fill up the grooves 12' and also to fill any recesses, scratches or voids either in the surface of the bearing layer 11' or in the interior thereof.

Those skilled in the art will appreciate that such conditions will produce very substantial compressive forces upon the body of bearing material 11' and that the bearing surface thereof will conform almost exactly to the surface of the mandrel 14b. Since the surface of mandrel 14b may be conveniently finished to a high degree of accuracy and polish, it is apparent that a very desirable and accurate bearing surface will be produced upon the bearing material 11 after the described heating operation.

In the final step of the process, the composite bearing is removed from the mold unit 14 and permitted to cool. Here again, the bearing material layer 11' tends to contract to a greater extent than the backing element 10' and, as a result, the bearing layer 11' separates into a plurality of circumferentially spaced sections, the separation taking place at the former location of the grooves 12'. As a result, the finished bearing automatically results in the configuration of the bearing of Figures 1 and 2 when cooled to ambient temperatures.

From the foregoing description, it is apparent that this invention provides not only a novel and desirable composite bearing construction but an unusually simple and economical method of manufacturing such bearing. While aluminum has been referred to as a specific example of the bearing material, it will be understood that the invention is in no way restricted to aluminum faced bearings, as the principles thereof may be equally applied to any other bearing material, such as copper, brass, silver, etc., having a coefficient of thermal expansion substantially greater than that of the material forming the backing element.

It will, of course, be understood that various details of construction or of operation of the process may be modified through a wide range without departing from the principles of this invention and it is, therefore, not the purpose to limit the patent granted hereon otherwise than necessitated by the scope of the appended claims.

I claim as my invention:

1. The method of forming a composite bearing from two materials, respectively, a bearing material and a backing material each having substantially different thermal expansion properties, which comprises, securing a layer of the bearing material onto a surface of the backing material, forming in the exposed surface of said bearing material layer a plurality of spaced grooves, heating the composite bearing to a temperature sufficiently above the expected operating temperature of the bearing but below the melting temperature of the bearing material to flow said bearing material to substantially close said grooves while concurrently holding said layers against relative deformation with respect to one another, and thereafter cooling the bearing to separate said bearing material into a plurality of sections separated at regions corresponding to the previous locations of said grooves.

2. The method of forming a composite bearing from two materials, respectively, a bearing material having a predetermined coefficient of thermal expansion and a backing material having substantially different thermal expansion properties, which comprises, securing a layer of bearing material onto a sheet of the backing material, forming in the exposed surface of said bearing material layer a plurality of spaced grooves, bending the composite sheet into an arcuate configuration with said bearing material layer on the inside, whereby said grooves are partially closed, heating the composite bearing to a temperature sufficiently above the expected operating temperature of the bearing but below the melting temperature of the bearing material to flow said bearing material to substantially close said grooves while concurrently holding said layers against relative displacement with respect to one another, and cooling the bearing while unconfined to separate said bearing material layer into a plurality of sections separated at regions corresponding to the previous locations of said grooves.

3. The method of forming a composite bearing from a bearing material and a backing material having appreciably different thermal expansion properties which comprises casting a layer of the bearing material on a perforate sheet of the backing material to concurrently secure portions of said layer to said sheet at a plurality of spaced regions corresponding to the perforate portions of the sheet of backing material, forming in the exposed surface of said bearing material layer a plurality of spaced grooves, bending the composite sheet into an arcuate configuration with said bearing material layer on the inside, thereby partially closing said grooves, heating the composite bearing to a temperature sufficiently above the expected operating temperature of the bearing but below the melting temperature of the bearing material to flow said bearing material and concurrently confining said bearing material layer and said backing sheet against relative movement with respect to one another to substantially close said grooves, and cooling the bearing to separate said bearing material layer into a plurality of sections separated at regions corresponding to the previous locations of said grooves.

4. The method of manufacturing a bi-metallic two layered bearing having a backing layer and a bearing surface layer each having appreciably different thermal expansion properties, which includes the steps of scoring a bearing surface to provide spaced grooves, thereafter flowing the bearing metal into the grooves at a temperature in excess of expected normal operating temperature of the bearing but below melting temperature of the bearing surface layer while concurrently confining the layers against relative movement with respect to one another, and cooling the bearing substantially below expected normal operating temperature while the layers are unconfined to form a plurality of spaced segments separated at the regions corresponding to the previous locations of the grooves.

ARTHUR TOWNHILL.

References Cited in the file of this patent

UNITED STATES PATENTS

| Number | Name | Date |
|---|---|---|
| 1,236,511 | Waring | Aug. 14, 1917 |
| 1,465,988 | Kingsbury | Aug. 28, 1923 |
| 1,731,790 | Payne | Oct. 15, 1929 |
| 1,772,355 | Klocke | Aug. 5, 1930 |
| 2,198,253 | Koehring | Apr. 23, 1940 |
| 2,277,023 | Steiner et al. | Mar. 17, 1942 |
| 2,289,572 | Underwood | July 14, 1942 |
| 2,333,227 | Bagley | Nov. 2, 1943 |
| 2,398,364 | Elfstrom | Apr. 16, 1946 |
| 2,427,203 | Essig | Sept. 9, 1947 |
| 2,528,154 | Ludwig | Oct. 31, 1950 |

FOREIGN PATENTS

| Number | Country | Date |
|---|---|---|
| 375,205 | Germany | May 9, 1923 |
| 584,004 | Great Britain | Jan. 3, 1947 |